(12) United States Patent
Van der Vegt (10) Patent No.: US 7,934,772 B2
(45) Date of Patent: May 3, 2011

(54) DEVICE FOR TRANSPORTING A CHILD

(75) Inventor: Herman Van der Vegt, Utrecht (NL)

(73) Assignee: Team-Tex S.A.S. (FR)

( * ) Notice: Subject to any disclaimer, the term of this patent is extended or adjusted under 35 U.S.C. 154(b) by 184 days.

(21) Appl. No.: 12/048,769

(22) Filed: Mar. 14, 2008

(65) Prior Publication Data

US 2008/0231098 A1    Sep. 25, 2008

(30) Foreign Application Priority Data

Mar. 15, 2007    (EP) ..................................... 07104249

(51) Int. Cl.
*B60N 2/26* (2006.01)
(52) U.S. Cl. .............. 297/256.1; 297/256.13; 297/250.1
(58) Field of Classification Search ............... 297/250.1, 297/256.1, 256.14, 256.16
See application file for complete search history.

(56) References Cited

U.S. PATENT DOCUMENTS

| | | | |
|---|---|---|---|
| 3,051,965 A | | 9/1962 | Szemplak et al. |
| 3,054,637 A | * | 9/1962 | Pambello ........................... 297/4 |
| 4,274,674 A | * | 6/1981 | Deloustal .................. 297/256.13 |
| 4,436,341 A | * | 3/1984 | Converse .................. 297/256.15 |
| 4,762,364 A | * | 8/1988 | Young ....................... 297/256.12 |
| 4,786,064 A | * | 11/1988 | Baghdasarian ................. 280/30 |
| 4,885,200 A | | 12/1989 | Perdelwitz, Jr. et al. |
| 5,092,004 A | * | 3/1992 | Cone et al. .......................... 5/94 |
| 5,366,271 A | * | 11/1994 | Johnston et al. ........... 297/250.1 |
| 5,431,479 A | * | 7/1995 | Leib ............................... 297/232 |
| 5,978,992 A | | 11/1999 | Antinori |
| 6,126,234 A | * | 10/2000 | Cabagnero ............... 297/256.13 |
| 6,679,552 B1 | * | 1/2004 | Kassai ........................ 297/250.1 |
| 2005/0011005 A1 | | 1/2005 | Borda |

FOREIGN PATENT DOCUMENTS

| | | |
|---|---|---|
| DE | 10253269 A1 | 5/2004 |
| EP | 0296759 A2 | 12/1988 |
| EP | 1481616 A1 | 12/2004 |
| FR | 2700452 A1 | 7/1994 |
| FR | 2859363 A1 | 3/2005 |
| WO | 9412079 A1 | 6/1994 |
| WO | 2005079239 A2 | 9/2005 |

OTHER PUBLICATIONS

European Search Report, EP07104249, Aug. 14, 2007, 4 pages.

* cited by examiner

*Primary Examiner* — Sarah B McPartlin
(74) *Attorney, Agent, or Firm* — St. Onge Steward Johnston & Reens LLC (57) ABSTRACT

A lower enclosure supports and protects a child's lower body and legs, and an upper enclosure supports and protects a child's head and shoulders. The lower and upper enclosures each have a bottom and each bottom is fixed to two side walls. A hinge connects the bottoms of the lower enclosure and the upper enclosure. Positioners position the enclosures relative to each other in a sitting position, with the bottoms making an obtuse angle, and a lying position, with the bottoms approximately in one plane. The positioners have a brace supporting the side walls and the bottoms.

19 Claims, 6 Drawing Sheets

DEVICE FOR TRANSPORTING A CHILD

CROSS-REFERENCE TO RELATED APPLICATIONS

The present application claims priority of European patent application No. 07104249.3 filed on Mar. 15, 2007, the content of which is incorporated herein by reference.

FIELD OF THE INVENTION

The invention concerns a device for transporting a child comprising a lower enclosure supporting (2) and protecting the legs and lower part of the child and an upper enclosure (6) supporting and protecting the head and shoulders of the child, whereby said lower and upper enclosures each have a bottom (1;8) and the device further comprises a first hinge (13;30) for connecting the bottoms of lower enclosure and the upper enclosure and positioning means (15) for positioning the enclosures relative to each other in a sitting position whereby the bottoms make an obtuse angle and in a lying position whereby the bottoms are approximately in one plane characterized in that each of the enclosures (2,6) has fixed to its bottom (1,8) opposite each other two side walls (3;4,7), and the positioning means comprise a brace (15;24) supporting the side walls (3; 7) and at least one of the bottoms (1,8).

BACKGROUND OF THE INVENTION

Such a device is known inter alia from EP 1481616. The known device has a U-shaped carrier that is placed under both enclosures. This device is large, heavy and not easy to handle.

SUMMARY OF THE INVENTION

In order to overcome these disadvantages the device includes a lower enclosure supporting (2) and protecting the legs and lower part of the child and an upper enclosure (6) supporting and protecting the head and shoulders of the child, whereby said lower and upper enclosures each have a bottom (1;8) and the device further comprises a first hinge (13;30) for connecting the bottoms of lower enclosure and the upper enclosure and positioning means (15) for positioning the enclosures relative to each other in a sitting position whereby the bottoms make an obtuse angle and in a lying position whereby the bottoms are approximately in one plane characterized in that each of the enclosures (2,6) has fixed to its bottom (1,8) opposite each other two side walls (3;4,7), and the positioning means comprise a brace (15;24) supporting the side walls (3; 7) and at least one of the bottoms (1,8). In this way each enclosure gives with its side walls strong sideways support to the child and there is no need for further parts than the enclosures and the supporting brace for carrying a child in a safe way. As the brace supports the enclosures sideways the forces acting between the child and the transporting device are directly transferred to or from the brace and the bottoms so that side walls need not take a sideways directed load and can be very light. This makes the device easy to carry.

In accordance with an embodiment, the device includes the brace (15) having two more or less parallel L-shaped sides and a connection bar that connects the short ends of the L-shaped sides and whereby the L-shaped sides and the connection bar preferably have the same width and thickness. In this way the brace supports the better part of the edges of the sides and the back of the upper enclosure and preferably has an uninterrupted stiffness when supporting these edges.

In accordance with an embodiment, the brace (15; 29) is connected with a second hinge (28, 31) to the one enclosure (2) and with at least one linear guide (20, 21; 27) to the other enclosure (6). This makes it easy to change the position of the enclosures from sitting position to lying position. When the brace is moved relative to the other enclosure this movement lets the enclosures rotate around the first hinge and makes them change from the sitting position to the lying position and vice versa.

In accordance with an embodiment, the brace (15, 29) is connected with two linear guides (20, 21) at both sides of the side walls (4) of the other enclosure (6). In this way the brace is fastened more stable to the side walls.

In accordance with an embodiment, the second hinge (28) connects the brace (15) to the middle of the bottom (17) of the one enclosure (2). As a result the brace has the shape of an uninterrupted hoop which can be relatively light.

In accordance with an embodiment, the second hinge (31) connects to the brace (29) at both sides of the bottom (17) of the one enclosure (2). As a result the turning points of the second hinge have a certain distance from each other which makes the second hinge more stable.

In accordance with an embodiment, the brace (15,29) is provided with at latch (20,21; 24,25,26,27) for positioning the brace in at least two positions relative to the other enclosure (6). As a result, it is easy to position the brace and the enclosures in two stable positions. In this way, the user can bring the inner child seat easily from a lying position to a sitting position or vice versa.

In accordance with an embodiment, the enclosures (2,6) are formed from thin plastic sheet material with on their inside surface foam-like cushioning material (23) which is preferably moulded on the plastic sheet material. This way the device can be made very light while the child is adequately cushioned in the enclosures.

In accordance with an embodiment, the thin plastic sheet material is an uninterrupted sheet for the upper and lower enclosures (2,6) and also forms the first hinge (30). This way the enclosures together form a smooth part that does not need fasteners for connecting the various parts.

In accordance with an embodiment, near the first hinge the bottoms (1,8) both have a support (12,14) for supporting the enclosures on a flat surface. This way the enclosures can rest directly on a table or a floor.

In accordance with an embodiment, the supports (12, 14) are formed from the thin plastic sheet material forming the outside of the enclosures (2, 6). This makes the enclosures very light and easy to produce.

In accordance with an embodiment, shoulder straps (37) for restraining the upper body of the child are guided along strap guides (40) through openings in the upper enclosure (6) and fastened to the brace (15,29), the shoulder straps being looped around a roller (39) whereby near the second hinge (28) an adjustable strap (42) connects the roller to the lower enclosure (2). As a result it is possible to bring the device from a sitting position to a lying position or vice versa whereby there is no need to change the length of the shoulder straps as they are automatically re-adjusted due to the movement of the brace relative to the upper enclosure.

In accordance with an embodiment, the strap guides (40) are displaceable and have positioning means on the inside and/or outside of the upper enclosure (6). In this way the position of the straps in the upper enclosure can be adjusted in an easy way to the length of the child.

In accordance with an embodiment, the brace (15,29) has on one or both sides of the upper enclosure a third hinge (11) for swivable connecting a carrying handle (9) that can be rotated from along the brace to above the gravity center of the child to be carried. As a result the carrying handle is coupled to the strongest part of the device that supports both enclosures and when the carrying handle is positioned near the brace the enclosures can be moved from sitting position to laying position and vice versa without obstruction by the carrying handle.

In accordance with an embodiment, the carrying handle (9) has a grip (19) and the distance between the grip and the rotation axis of the third hinge (11) is shorter than half of the distance from the bottom of the lower enclosure (2) to the top of the upper enclosure (6) and preferably approximately one third of this distance. As the carrying handle is shorter than half the length of the device the carrying handle is very low above the child. This makes carrying the transporting device and placing the device in a car easier.

In accordance with an embodiment, the device includes an outer shell (43) with means (46,47,54) for fastening said outer shell in a car, said outer shell being designated for supporting the enclosures (2,6) and/or the brace (15;29). The outer shell gives additional protection to and strengthens the enclosures so that the child in the enclosures is better protected and the enclosures can be kept very light. Also it makes it easy to place the enclosures with the child positioned in the straps in the car.

In accordance with an embodiment, the outer shell (43) has first connecting means (52,53) for coupling the outer shell and the brace (15;29) when the enclosures (1,6) are placed in the outer shell. This makes coupling the enclosures to the outer shell easier as only the brace has to be coupled.

In accordance with an embodiment, the outer shell (43) has protuberances that fit into notches of the brace (15) allowing relative movement of the brace in only one direction and a first brace hook at the side of the lower enclosure and a second brace hook at the side of the upper enclosure for holding the brace against the outer shell and whereby the first brace hook and/or the second brace hook is movable for releasing the brace from the outer shell. In this way the brace is coupled to the outer shell in an easy way and can be uncoupled at the side of the lower enclosure and/or at the side of the upper enclosure.

In accordance with an embodiment, the device includes a transport or support means with second connecting means suitable for coupling to the brace (15;29). As a result enclosures with the child in it can be placed in an easy movement on a transport or support means.

In accordance with an embodiment, a sling is connectable to the brace (15;29) at connecting points and/or a sling is elastically extendable from within the brace to a defined length. As a result the device can be carried with the sling around a shoulder which makes the carrying of it easy.

The invention also concerns the clothing for the device including a clothing covering the inside of the enclosures (1,6) which clothing comprises a back part that covers and/or is coupled to the bottom of the upper enclosure, the first hinge and the bottom of the lower enclosure, first side parts attached to the back part and coupled to the sides of the upper enclosure, second side parts attached to the back part and coupled to sides of the lower enclosures, and two side covers that are connected to either the first side parts or the second side parts, whereby each side cover covers the opening between a side wall of the upper enclosure and a side wall of the lower enclosure. By using the clothing with side covers no material or parts of the child can come between the upper enclosure and the lower enclosure in the opening thereby preventing damage or accidents.

BRIEF DESCRIPTION OF THE DRAWINGS

The invention will now be elucidated with the help of a description of one or more embodiments, using a drawing. In the drawing

DETAILED DESCRIPTION OF THE INVENTION

Figure 1:
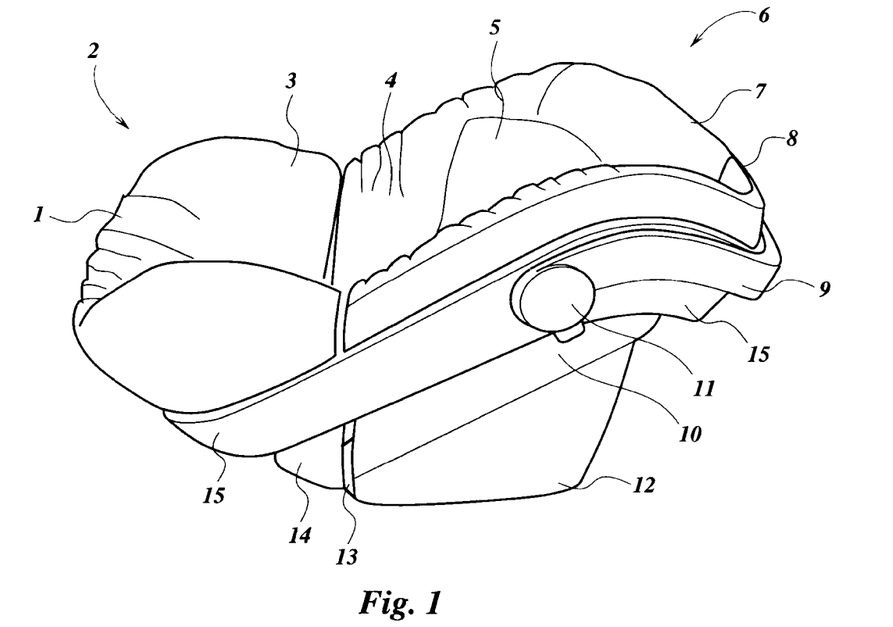
FIG. 1 shows a perspective side view of an inner child seat ready for placing a child in the inner child seat in a sitting position.
Figure 2:
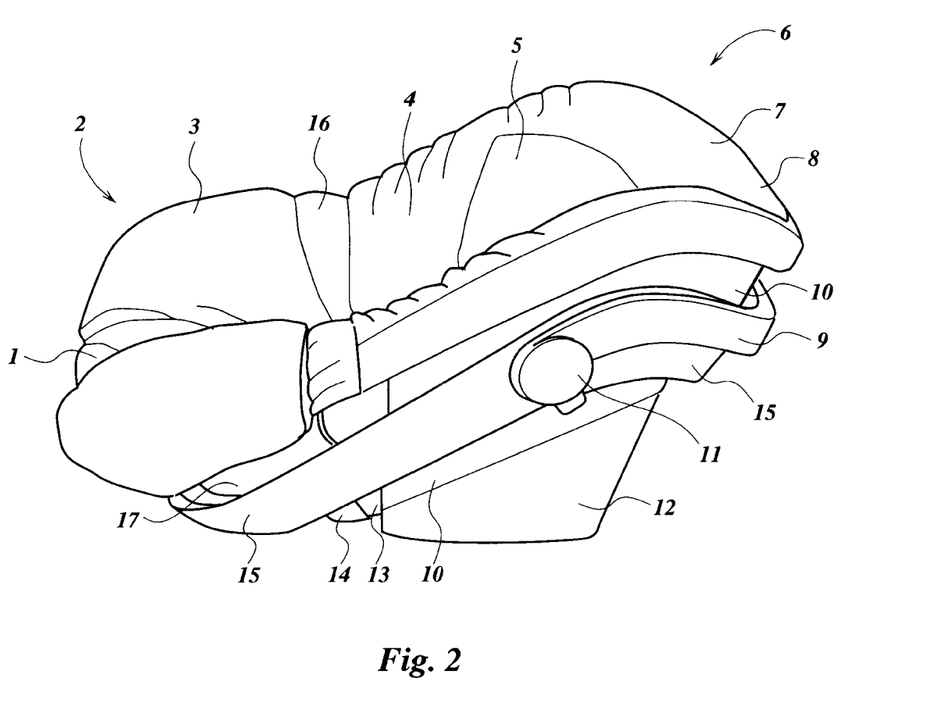
FIG. 2 shows the inner child seat of FIG. 1 whereby the child in the inner child seat is in a lying position.

FIGS. 1 and 2 show a child seat also known as an infant carrier, hereafter referred to as an inner child seat. The inner child seat is designed as being suitable for new born children and/or very young children. FIG. 1 shows the inner child seat in a first position whereby the inner child seat is positioned such that there is an angle between the child's' legs and its back so that the child more or less sits in the inner child seat. FIG. 2 shows the inner child seat in a second position whereby the inner child seat is positioned such that the child can lay extended with its legs and back more or less in a flat plane or slightly angled under an angle of 10-15 degrees.

The inner child seat has a lower body enclosure 2 and an upper body enclosure 6 which are connected in the bottom plane by a hinge 13. The lower body enclosure 2 is more or less U-shaped with lower side supports 3 which extend above the plane of a leg support 1. The upper body enclosure 6 also is more or less U-shaped with upper side supports 4 extending above the plane of a back support 8. The back support 8 is considerably longer than the leg support 1 as the young child's back is longer than its legs. The hinge 13 connects the leg support 1 and the back support 8. The side supports 4 on the top side away from the lower body enclosure 2 function as head supports 7 for sideways supporting the head of the child, which is slightly smaller than its body so that the distance between the head supports 7 is smaller than the distance between the upper side supports 4. For further protecting the head of the child there are head cushions 5.

The outside of the upper body enclosure 6 is formed by an upper outer wall 10, the outside of the lower body enclosure 2 is formed by the lower outer wall 17. The upper outer wall 10 is supported by two upper feet 12 and the lower outer wall 17 is supported by two lower feet 14. In the first position as shown in FIG. 1 the lower feet 14 and the upper feet 12 can be positioned on a flat surface and then form an arc so that the inner child seat can rock on this surface. The leg support 1 and back support 8, which are coupled with the hinge 13 are more or less perpendicular to each other so that the child can sit in the inner child seat. In this first position, the lower side supports 3, the upper side supports 4 and the head supports 7 are sideways supported by a brace 15. The brace 15 is hingeably connected to the lower body enclosure 2 and movably connected to the upper body enclosure 6. In the first position, shown in FIG. 1, the brace 15 is in a high position latched to the upper body enclosure 6. In the second position shown in FIG. 2 the brace 15 has moved downwards along the upper body enclosure 6. In this position the lower body enclosure 2 and the upper body enclosure 6 have moved relative to one another by rotating in the hinge 13 and the leg support 1 and the back support 8 are more or less in line. It is possible that the brace 15 is latched in the lower position on the upper body enclosure 6 or that it can be latched into one or more intermediate positions. The brace 15 is designed such that in the position shown in FIG. 1 the brace supports the upper edge of the upper side supports 4 and the edge of the back support 8 of the upper body enclosure 6. Thereby the brace 15 strengthens the side supports 4, and the back support 8 so that the child in the seat protected as much as possible by the brace 15. This means that the brace 15 has two more or less parallel L-shaped sides and a connection bar that connects the short ends of the L-shaped sides. Preferably the L-shaped sides of the brace 15 and the connection bar have the same width and thickness so that the brace 15 has an unchanged resistance against deformation.

In FIGS. 1 and 2 the inner child seat is shown ready for use and is covered in the customary manner with padded clothing in order to improve comfort of the child as much as possible. The padded clothing is provided with a cover pad 16 that covers the gap between the lower body enclosure 2 and the upper body enclosure 6 in the situation that the inner child seat is in the second position in order to prevent that the child's limbs being trapped in the gap between the enclosures.

Figure 3:
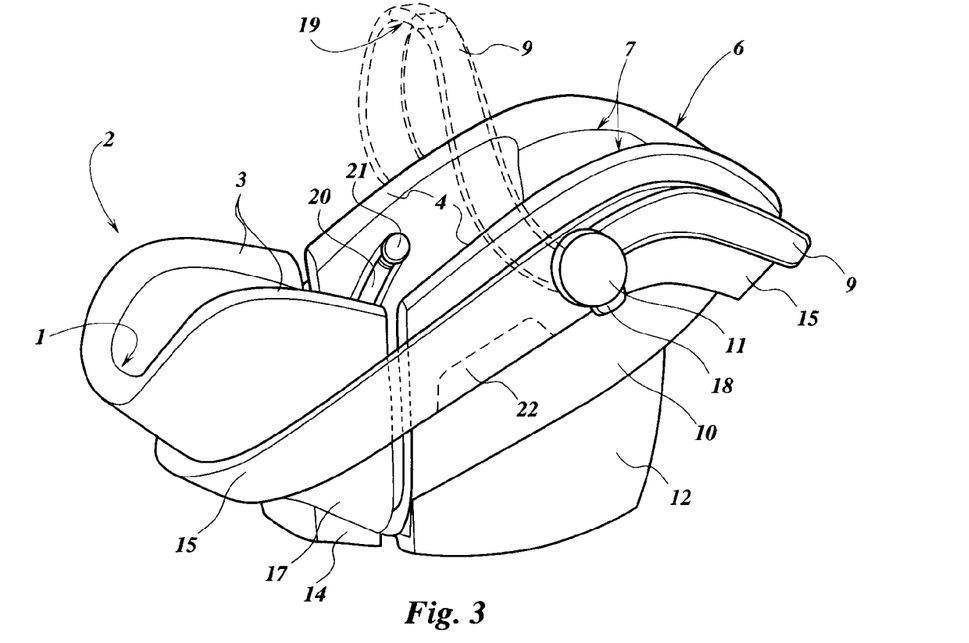
FIG. 3 shows the inner child seat of FIG. 1 in a view without the protective clothing showing the structure of the various parts.
Figure 4:
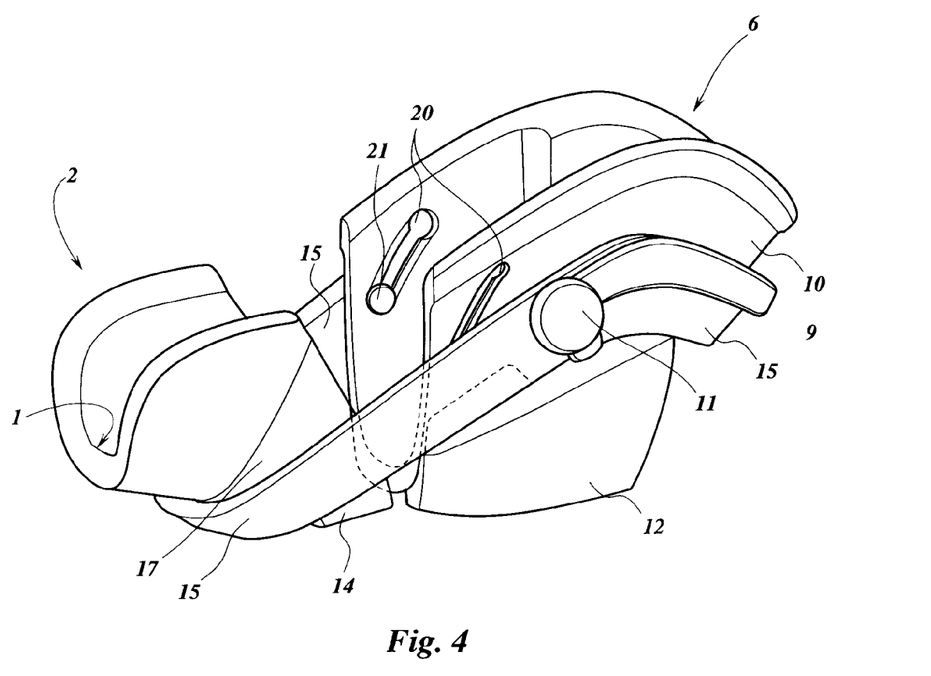
FIG. 4 shows the inner child seat of FIG. 2 in a view without the protective clothing.

FIGS. 3 and 4 show the inner child seat in respectively first and second position as shown in FIGS. 1 and 2 without the padded clothing. For guidance and support the brace 15 is provided with a pin 21 that slides in a slot 20 that is in the upper side support 4 so that the brace 15 is guided along the side wall of the upper side support 4. In a further embodiment, the position of the brace 15 can be fixed by locking the pin 21 in the end positions of the slot 20. The brace 15 is further provided with a carrying handle 9 that is rotatable coupled to the brace 15 by a handle hinge 11. The handle hinge 11 has a handle release knob 18 so that the carrying handle 9 can be positioned along the brace 15 and more or less perpendicular to the brace 15 as indicated with interrupted lines in FIG. 3 whereby the inner child seat can be carried using the carrying handle 9.

The handle hinge 11 is connected to the brace 15 at a distance approximately one third of the length of the inner child seat from the upper or head side of the upper body enclosure 6 so that the carrying handle 9 is considerably shorter than half the length of the inner child seat. During carrying the inner child seat, a grip 19 in the middle of the carrying handle 9 is, because of the short carrying handle 9, relative low above the center of gravity of the inner child seat. This short carrying handle 9 makes it easier to carry the inner child seat close to the body and to position the inner child seat in a limited space such as the rear seat of a car.

For carrying the inner child seat (when not using the carrying handle 9) the brace 15 is provided on both sides of the inner child seat with a cavity 22. The lower body enclosure 2 and the upper body enclosure 6 as shown in FIGS. 3 and 4 are made from synthetic material preferably with a foam on the inside. There is no need for reinforcements in the material so that the inner child seat is very light and easy to carry as strength for protecting the child positioned in inner child seat when subject to strong forces for instance when fastened in a car is provided by the brace 15. During use the brace 15 is positioned along the edges of the lower side support 3, the upper side support 4 and the head support 7 so that forces on these sides are absorbed and guided through by the brace 15.

Figure 5:
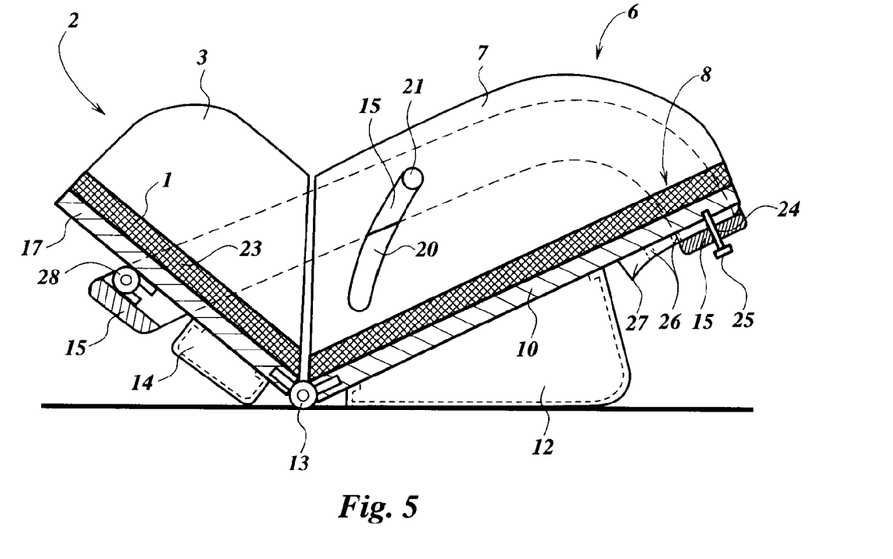
FIG. 5 shows a simplified view of the longitudinal section of the inner child seat as shown in FIG. 1.
Figure 6:
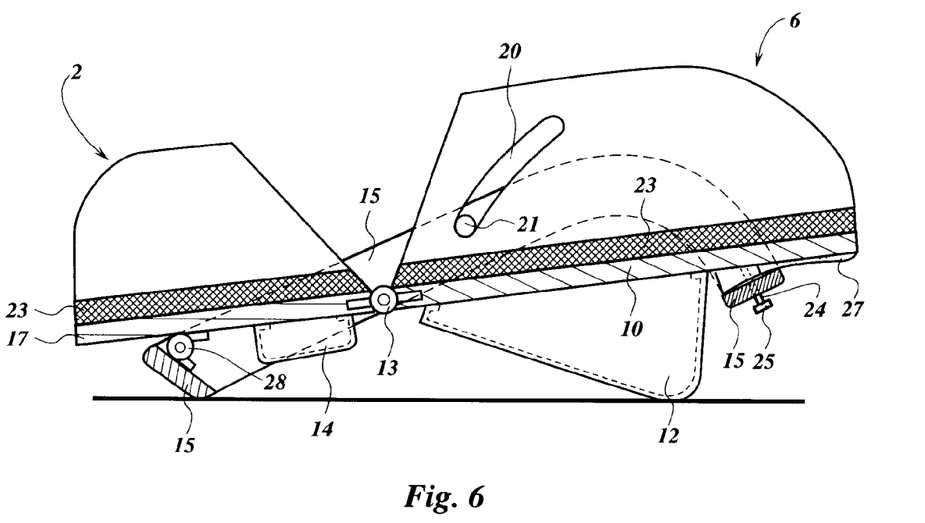
FIG. 6 shows a simplified view of the longitudinal section of the inner child seat as shown in FIG. 2.

FIGS. 5 and 6 show in cross section respective an embodiment of the inner child seat in the first and the second position. The lower outer wall 17 is connected to the upper outer wall 10 with the hinge 13. On the insides of these outer walls 10 and 17 a foam 23 is moulded for protecting the child in the inner child seat. The brace 15 is connected to the outside of the lower outer wall 17 with a hinge 28. On the head side of the upper outer wall 10 two rails 27 are fastened for guiding the brace 15. For positioning the brace 15 there is a latch 25 with pins 24 that can be inserted in holes 26. As indicated earlier, in another embodiment the brace 15 can be locked in two positions by locking the pin 21 in two positions in the slot 20.

Figure 7:
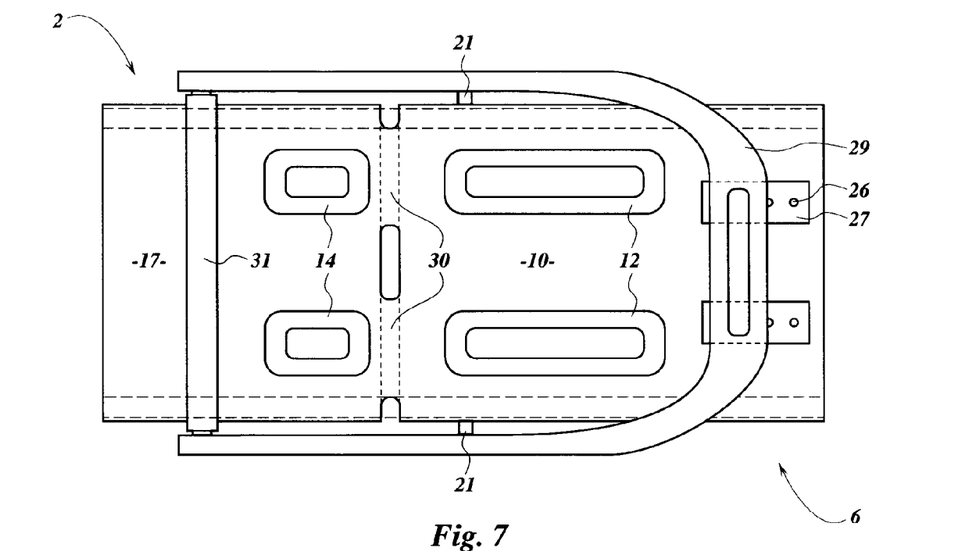
FIG. 7 shows a bottom view of an inner child seat which is similar to the inner child seat of FIG. 1 and which has a U-shaped brace and a simplified hinge design.

FIG. 7 shows a further embodiment of the inner child seat whereby a brace 29 is U-shaped instead of more or less rectangular. The U-shaped brace 29 is coupled to a hinge 31 of the lower body enclosure 2. In this embodiment the lower outer wall 17 and the upper outer wall 10 form a single part for instance made from sheet material with a hinge in a hinge area 30. Preferably the lower feet 14, the upper feet 12 and the reinforcement are also made from the sheet material so that the inner child seat can be produced in one part.

The embodiments shown in the FIGS. 1-7 are shown as examples. The brace 15, 29 is shown as being hingeable to the lower body enclosure 2. It is equally possible that the brace 15, 29 is hingeable to the upper body enclosure 6. The positioning of the brace 15, 29 can be done in other ways than the described rails, for instance by positioning and latching the pins 21 in slot 20 or any other way. For carrying the inner child seat generally the handle 9 will be used. For carrying the inner child seat over longer distances the handle can be provided with a sling strap (not shown) that can be carried over the shoulder, whereby the inner child seat can rest against a hip. When not in use this sling strap is retracted in the brace 15 by an elastic cord or it can be separately fastened to the brace 15.

Figure 8:
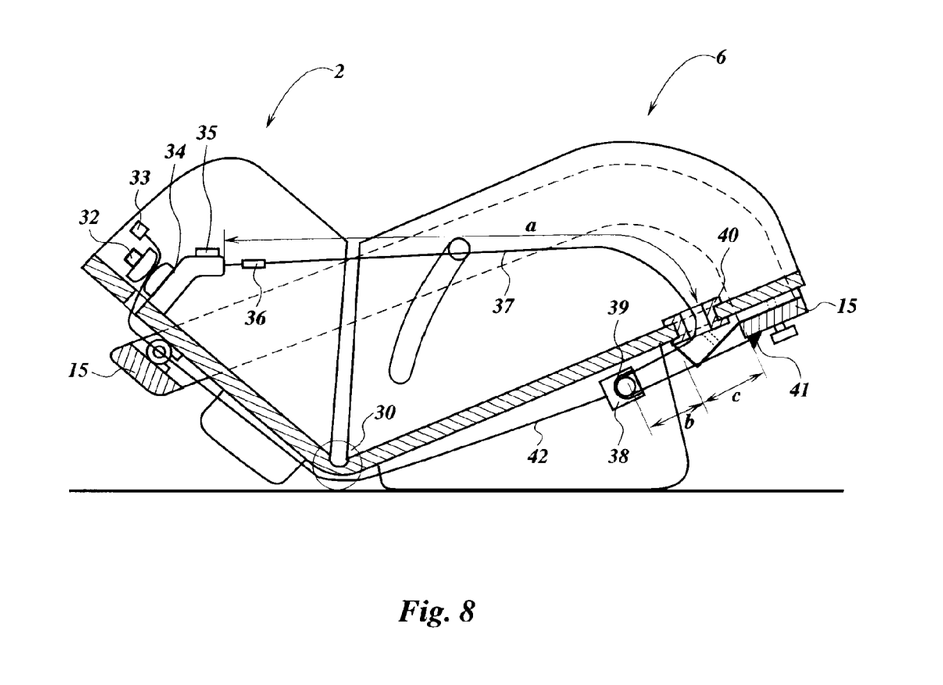
FIG. 8 shows a simplified section view of the course and fastening of a shoulder strap that holds a child in an inner child seat when the inner child seat is in a sitting position.
Figure 9:
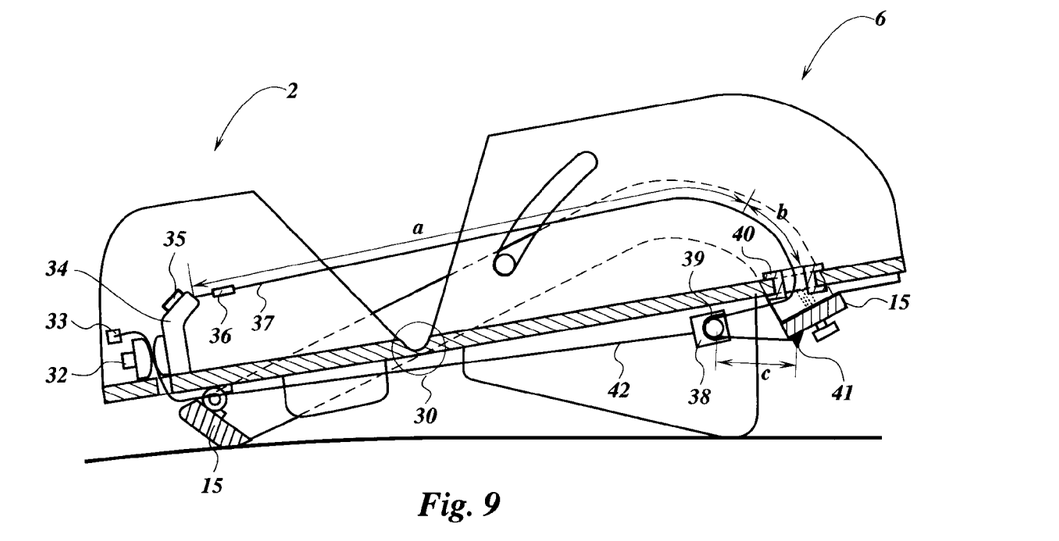
FIG. 9 shows the section view of FIG. 8 when the inner child seat is in a lying position.

FIGS. 8 and 9 diagrammatically show how the length of a shoulder strap 37 is adjusted when the inner child seat is brought from its first position to its second position. With the inner child seat in the first position as shown in FIG. 8 the child can be held in the inner child seat using the shoulder strap 37 with a buckle 36 is held in a clip 35, which is part of a support 34. The support 34 is located on the leg support 1 of the lower body enclosure 2 between the legs of the child. The other end of the shoulder strap 37 is guided through a strap guide 40 which is in the back support 8 and around a pin 39 and is attached with a fastener 41 on the brace 15. The pin 39 is part of a holder 38 which is connected to a tensioning strap 42 of which a strap end 33 is guided through a tensioning clamp 32. The shoulder strap 37 that holds the child against the lower body enclosure 2 and the upper body enclosure 6 when they are in the first position (the child is sitting) has a length "a". The strap guide 40 which might have several positions for guiding the shoulder strap 37 or might be adjustable in the upper body enclosure 6 is located such that with length "a" the child is sufficiently restrained for safety reasons and also sufficiently restrained and comfortable in the inner child seat. The length "a" of the shoulder strap 37 is adjusted with the tensioning strap 42 so that the distance between the pin 39 and the brace 15 is "b+c".

In FIG. 9 the inner child seat is shown in its second position whereby the child is lying more or less on a flat surface. Due to unfolding of the lower body enclosure 2 and the upper body enclosure 6, the length of the shoulder strap 37 enclosing the child has to be increased in order that the child remains comfortable. Due to the unfolding the brace 15 moves relative the upper body enclosure 6 so that the distance between the pin 39 and the brace 15 is reduced to "c" and the length of the shoulder strap 37 between the clip 35 and the strap guide 40 is increased to "a+b". In this way the length of the shoulder strap 37 is automatically adjusted when the inner child seat is brought in the second position.

The automatic length adjustment of the shoulder strap 37 in case of a child seat of a different design whereby an upper half and a lower half of the child seat are coupled by a hinge is also possible in situations whereby there is no brace 15. In that case the end of the shoulder strap 37 is after looping around the pin 39 fastened by a fastener 41 to a coupling bar that is fastened by a pivot to the lower half. The coupling bar will be designed to fit under or along the sides of child seat.

Figure 10:
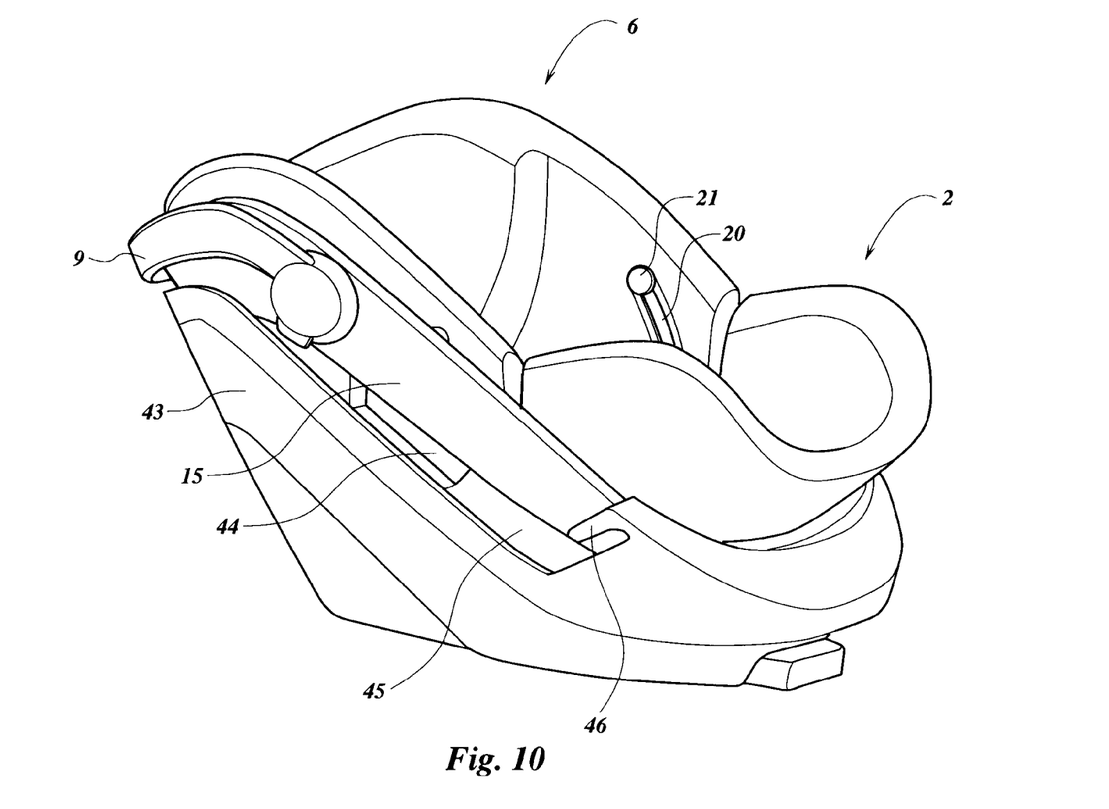
FIG. 10 shows a perspective view of the inner child seat of FIG. 1 without protective clothing and mounted in an outer shell ready for placing the inner child seat in a car.
Figure 11:
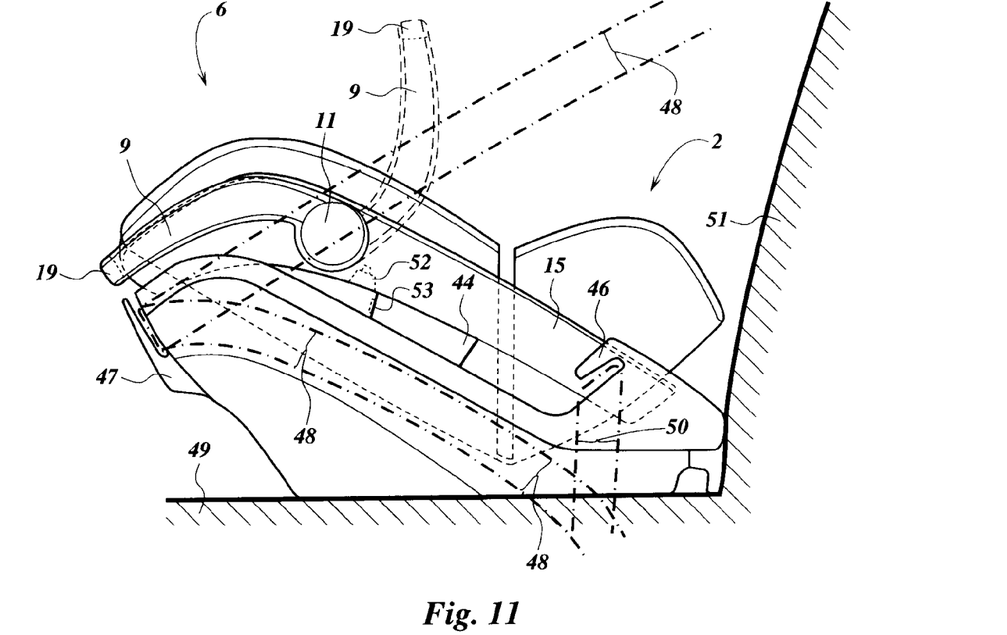
FIG. 11 shows a side view of the inner child seat and outer shell place on the seat of a car.
Figure 12:
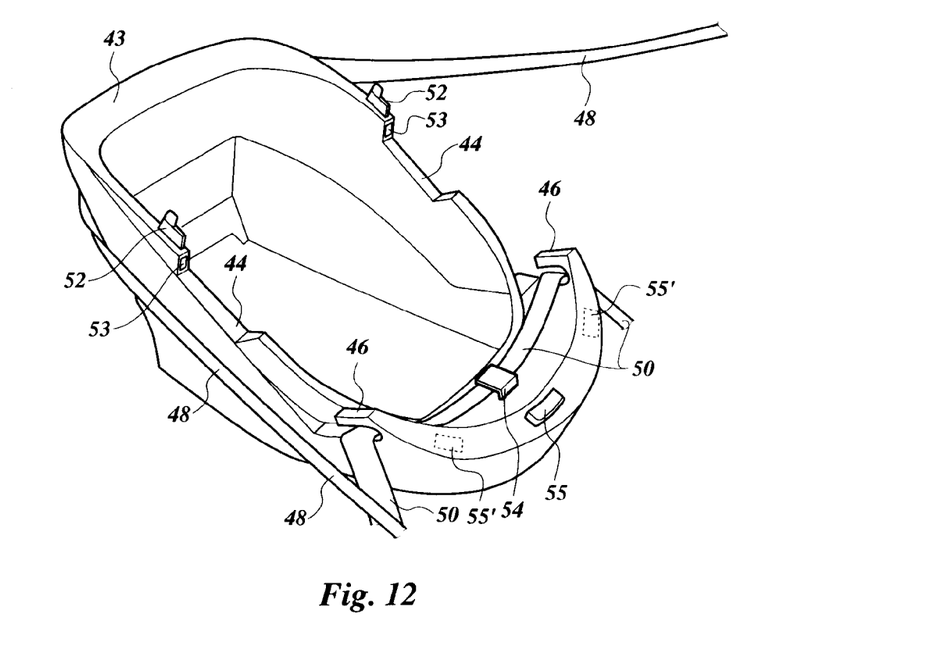
FIG. 12 shows a perspective view of the outer shell of FIGS. 10 and 11 when placed in a car.

The inner child seat can be used for transporting a child by carrying the inner child seat. For transporting the child in a car the inner child seat can be fastened in a seat outer 43 as shown in the FIGS. 10 and 11, FIG. 12 shows the seat outer 43 as fastened in a car and ready for placing the inner child seat in it. The brace 15 is releasable fastened on a brace support 45 of the seat outer 43. The brace support 45 has an opening 44 with knobs 53 (see FIG. 12) for moving guide locks 52 (see FIG. 12) releasing the brace 15 from the seat outer 43 so that the inner child seat can be taken out or lifted. In addition to knobs 53 in the opening 44 on both sides of the seat outer 43 there is also a control button 55 placed in the center of the seat outer 43 that moves both guide locks 52 and releases the brace 15 from the seat outer 43 on both sides. Instead of the centrally placed control button 55 there can be control buttons 55' (shown in interrupted lines) that are placed on both sides and that move both guide locks 52. The inner child seat can be lifted out by gripping the brace 15 in the openings 44 on both sides of the inner child seat. It is also possible to use the carrying handle 9 for lifting the inner child seat out of the seat outer 43.

In a further embodiment the coupling of the brace 15 to the seat outer 43 can be arranged by coupling the brace 15 at the head side, which is the side of the upper enclosure 6, and the foot side, which is the side of the lower enclosure 2, of the inner child seat to the seat outer 43 with movable hooks. In this embodiment (not shown) the movable hooks hold the brace 15 in a fixed position in the seat outer 43, fixed by the shape of the seat outer 43 and/or protuberances on the seat outer 43 that fit in notches of the brace 15. The movable hooks thereby can either grip around the brace 15 or grip a pin in a notch in the brace 15. When either the movable hook at the head side or the movable hook at the foot side of the seat outer 43 is moved the brace 15 can be lifted at that side until the notches are free of the protuberances and after that the other hook comes free of the brace and the inner child seat can be lifted out of the seat outer 43. In this way the inner child seat can be released from the seat outer 43 with knobs on the seat outer 43 near the movable hooks at either the head side and with knobs near the movable hooks at the foot side. It will be obvious that according to a simplification instead of the hooks at both sides being movable the hooks on either the head side or the foot side can be fixed.

The seat outer 43 can be fastened in a car using a hip strap 50 and a diagonal strap 48. The seat outer 43 is placed on a car seat 49 and positioned against a seat back 51 and the hip strap 50 and diagonal strap 48 are looped around the seat outer 43 as shown in FIGS. 11 and 12 using guide hooks 46 and 54. After the positioning of the seat outer 43 in the car the inner child seat is positioned in the seat outer 43 using guide locks 52 (see FIG. 12) fitting in holes in the brace 15. The guide locks 52 lock the inner child seat in the seat outer 43. Another way of mounting the seat outer 43 in a car is using a base (not shown) designed for coupling to the underside of the seat outer 43. The base is mounted in the car using hooks to couple the base to "Isofix" attachments in the car.

The inner child seat with child can also be transported using a stroller. Thereby the inner child seat is coupled to an interface of the stroller. The stroller has a brace support and guide locks that are more or less similar to the brace support 45 and guide lock 52 as used in the seat outer 43. Preferably the brace support of the stroller can be tilted. By adjusting the brace support the child seat can be brought in tilt positions that are suitable for the age of the child. In this way a younger child can lay flat when transported on the stroller and an older child can sit in the child seat

What is claimed is:

1. A device for transporting a child comprising a lower enclosure supporting and protecting the legs and lower part of the child and an upper enclosure supporting and protecting the head and shoulders of the child, whereby said lower and upper enclosures each have a bottom and each bottom is fixed to two side walls, the device further comprises a first hinge for connecting the bottoms of the lower enclosure and the upper enclosure and positioning means for positioning the enclosures relative to each other in a sitting position whereby the bottoms make an obtuse angle and in a lying position whereby the bottoms are approximately in one plane characterized in that the positioning means comprise a brace supporting the side walls and at least one of the bottoms, and the brace has two parallel L-shaped sides, each comprising a short leg and a long leg, and a connection bar that connects the short legs of the L-shaped sides, and the L-shaped sides and the connection bar have approximately the same width and thickness.

2. A device for transporting a child comprising a lower enclosure supporting and protecting the legs and lower part of the child and an upper enclosure supporting and protecting the head and shoulders of the child, whereby said lower and upper enclosures each have a bottom and each bottom is fixed to two side walls, the device further comprises a first hinge for connecting the bottoms of the lower enclosure and the upper enclosure and positioning means for positioning the enclosures relative to each other in a sitting position whereby the bottoms make an obtuse angle and in a lying position whereby the bottoms are approximately in one plane characterized in that the positioning means comprise a brace supporting the side walls and at least one of the bottoms and a second hinge connects the brace to either the upper enclosure or the lower enclosure and at least one linear guide connects the brace to the other enclosure.

3. The device in accordance with claim 2 whereby two linear guides connect the brace to both sides of the side walls of the other enclosure.

4. The device in accordance with claim 2 whereby the second hinge connects the brace to the bottom of either the upper enclosure or the lower enclosure.

5. The device in accordance with claim 2 whereby the brace is provided with a latch for positioning the brace in at least two positions relative to the linear guide.

6. The device in accordance with claim 2 whereby the enclosures are formed from thin plastic sheet material with on their inside surface foam cushioning material which can be moulded onto the plastic sheet material.

7. The device in accordance with claim 6 whereby the thin plastic sheet material is an uninterrupted sheet for the upper and lower enclosures and also forms the first hinge.

8. The device in accordance with claim 2 whereby near the first hinge the bottoms both have a support for supporting the enclosures on a flat surface.

9. The device in accordance with claim 8 whereby the enclosures are formed from thin plastic sheet material and the supports are formed from the thin plastic sheet material forming the enclosures.

10. The device in accordance with claim 2 whereby shoulder straps for restraining the upper body of the child are guided along strap guides through openings in the upper enclosure and fastened to the brace, the shoulder straps being looped around a roller whereby near the second hinge an adjustable strap connects the roller to the lower enclosure.

11. The device in accordance with claim 10 whereby the strap guides are displaceable and have positioning means on the upper enclosure.

12. A device for transporting a child comprising a lower enclosure supporting and protecting the legs and lower part of the child and an upper enclosure supporting and protecting the head and shoulders of the child, whereby said lower and upper enclosures each have a bottom and each bottom is fixed to two side walls, the device further comprises a first hinge for connecting the bottoms of the lower enclosure and the upper enclosure and positioning means for positioning the enclosures relative to each other in a sitting position whereby the bottoms make an obtuse angle and in a lying position whereby the bottoms are approximately in one plane characterized in that the positioning means comprise a brace supporting the side walls and at least one of the bottoms and the brace has on one or both sides of the upper enclosure a third hinge with a hinge axis for swivable connecting a carrying handle that can be rotated from along the brace to above the gravity centre of the child to be carried.

13. The device in accordance with claim 12 whereby the carrying handle has a grip and the distance between the grip and the hinge axis of the third hinge is shorter than half of the overall length of the device from a tip of the upper enclosure to a tip of the lower enclosure in the lying position.

14. A device for transporting a child comprising a lower enclosure supporting and protecting the legs and lower part of the child and an upper enclosure supporting and protecting the head and shoulders of the child, whereby said lower and upper enclosures each have a bottom and each bottom is fixed to two side walls, the device further comprises a first hinge for connecting the bottoms of the lower enclosure and the upper enclosure and positioning means for positioning the enclosures relative to each other in a sitting position whereby the bottoms make an obtuse angle and in a lying position whereby the bottoms are approximately in one plane characterized in that the positioning means comprise a brace supporting the side walls and at least one of the bottoms and the device comprises an outer shell with means for fastening said outer shell in a car, said outer shell being designed for supporting the enclosures and/or the brace.

15. The device in accordance with claim 14 whereby the outer shell has first connecting means for coupling the outer shell and the brace when the enclosures are placed in the outer shell.

16. The device in accordance with claim 14 whereby the outer shell has protuberances that fit into notches of the brace allowing relative movement of the brace in only one direction and a first brace hook at the opposite sides of the outer shell for holding the brace against the outer shell and whereby the first brace hook and/or the second brace hook is movable for releasing the brace from the outer shell.

17. The device in accordance with claim 14 comprising a transport or support means with second connecting means suitable for coupling to the brace.

18. The device in accordance with claim 14 whereby a sling is connectable to the brace at connecting points and/or a sling is elastically extendable from within the brace to a defined length.

19. The device according to claim 14 comprising a clothing for covering the inside of the enclosures, which clothing comprises a back part that covers and/or is coupled to the bottom of the upper enclosure, the first hinge and the bottom of the lower enclosure, first side parts attached to the back part and coupled to the sides of the upper enclosure, second side parts attached to the back part and coupled to sides of the lower enclosures, and two side covers that are connected to either the first side parts or the second side parts, whereby each side cover covers an opening between a side wall of the upper enclosure and a side wall of the lower enclosure.

* * * * *